Dec. 10, 1946.  M. HILMER ET AL  2,412,218
CONTROL DEVICE
Filed Aug. 31, 1944   4 Sheets-Sheet 1
Fig. 1.
Fig. 2.
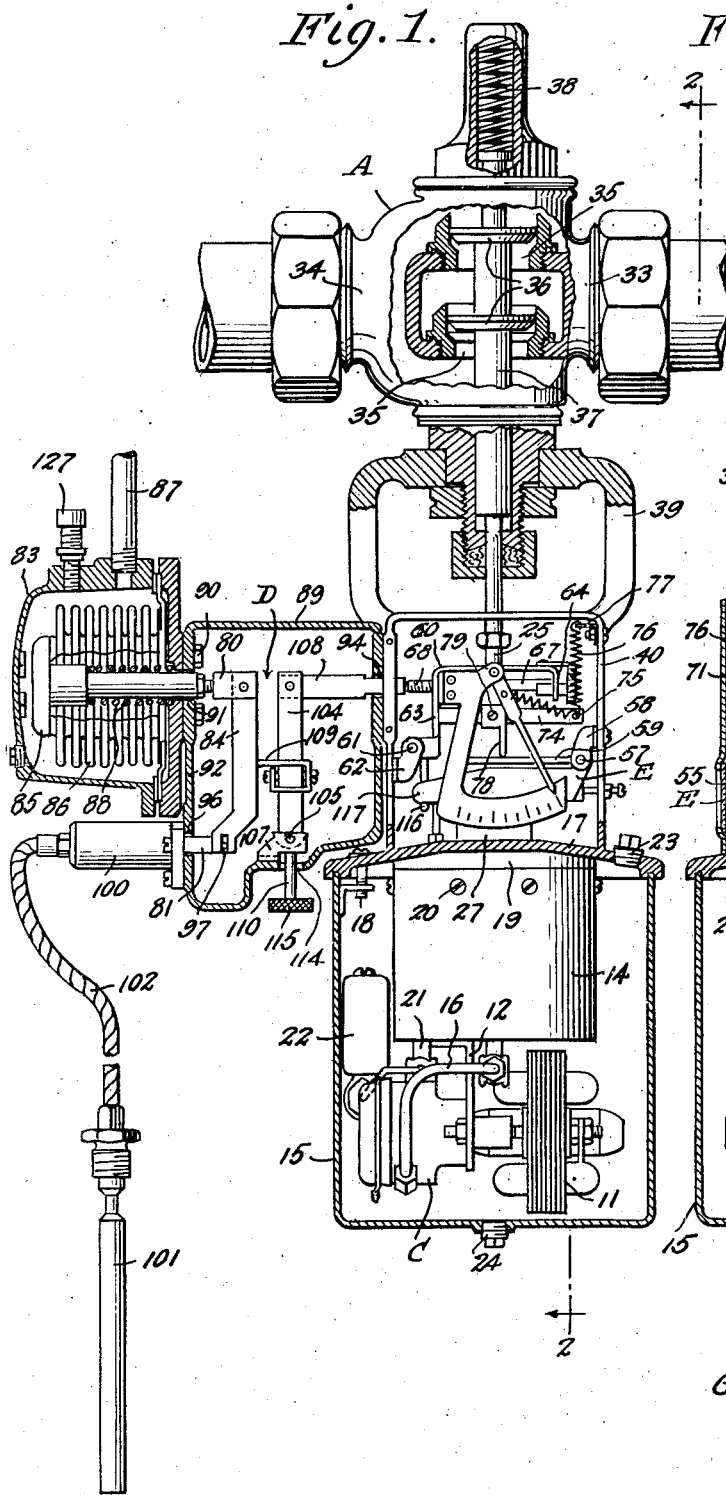
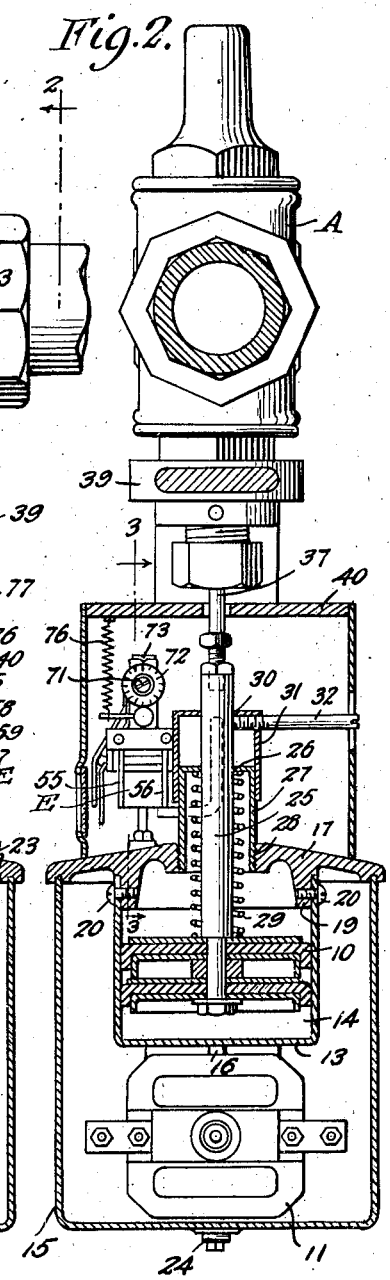
INVENTORS
MILTON HILMER
GEORGE J. SIGNAROVITZ
THOMAS NAPIER ADLAM
By Clark & Ott
ATTORNEYS

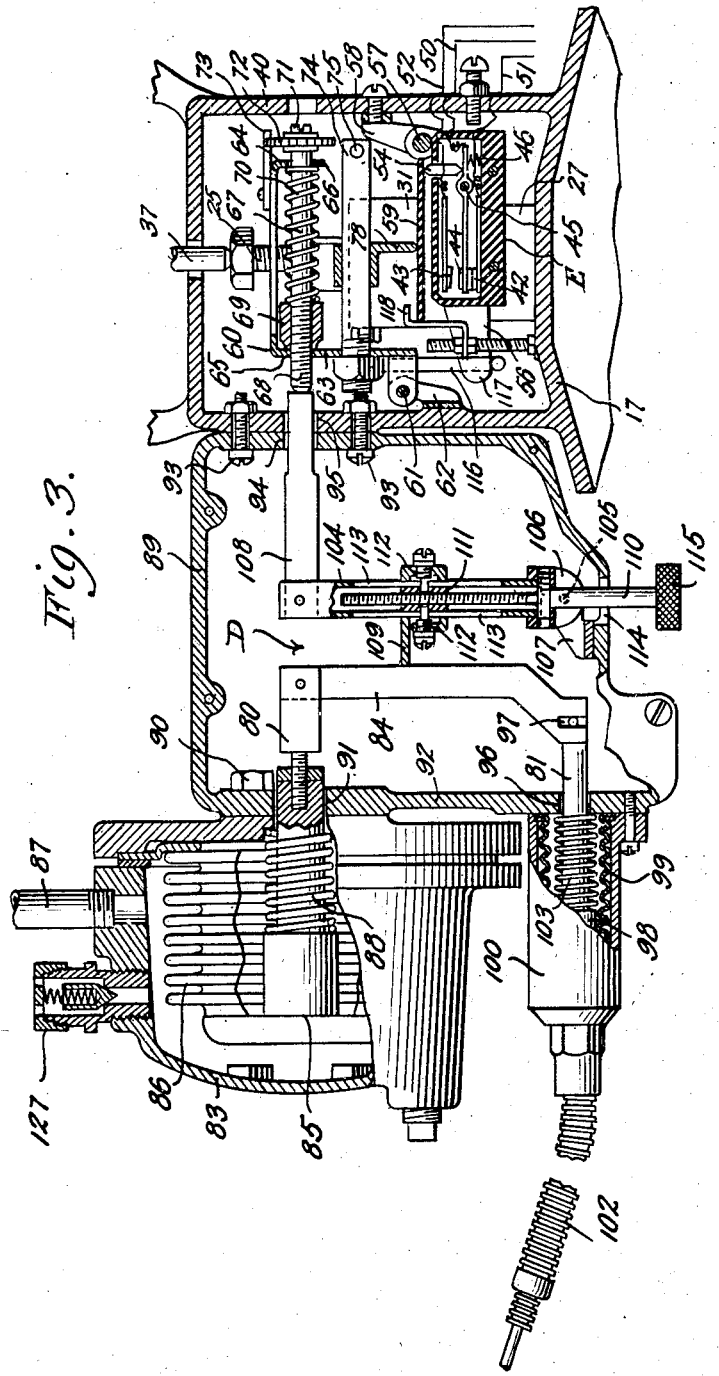

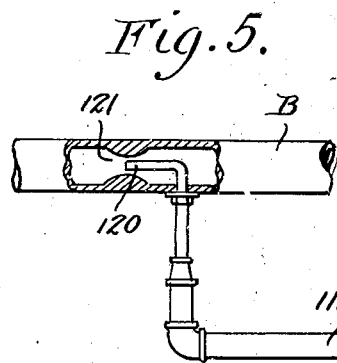
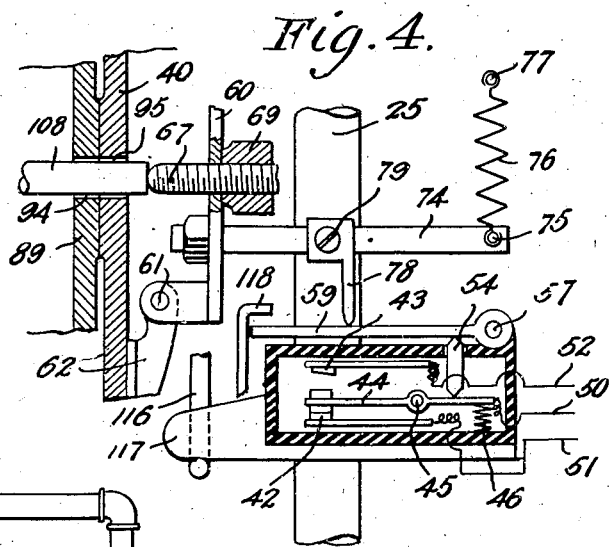
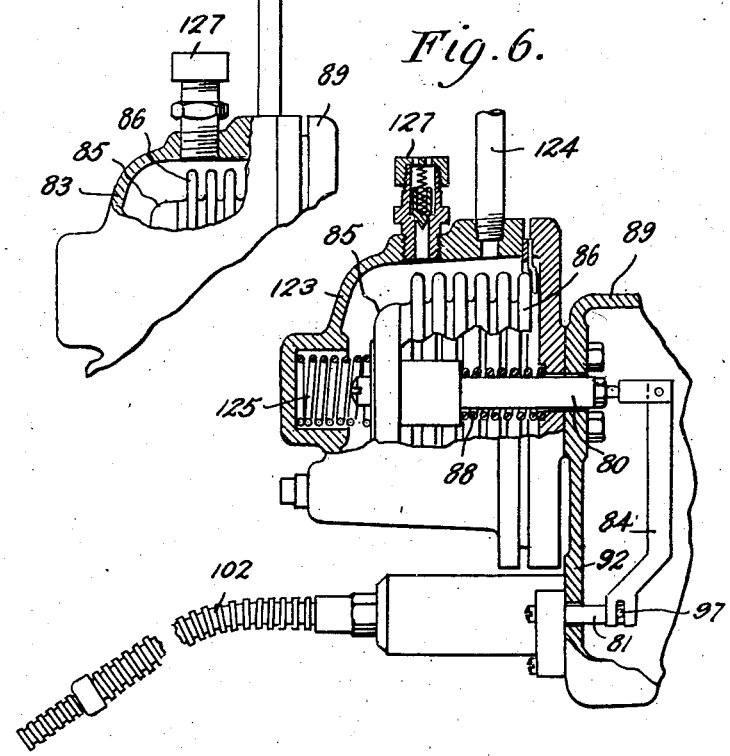
INVENTORS
MILTON HILMER
GEORGE J. SIGNAROVITZ
THOMAS NAPIER ADLAM
BY Clarke & Ott
ATTORNEYS

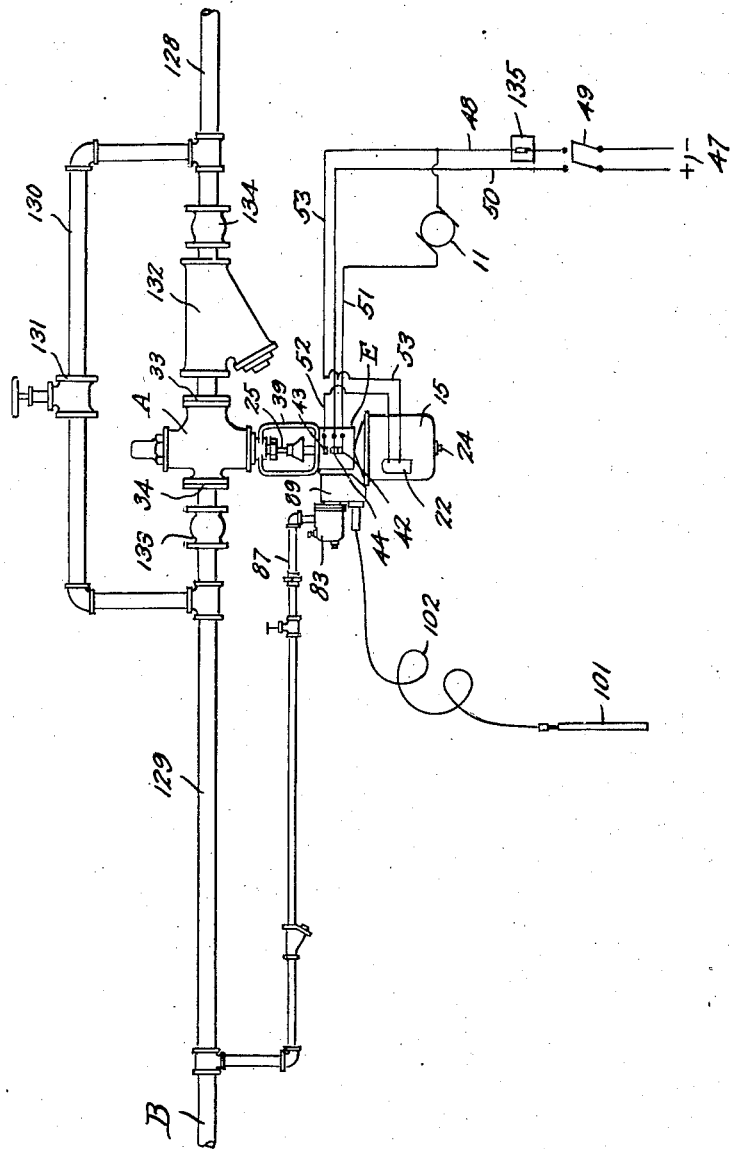

Patented Dec. 10, 1946

2,412,218

UNITED STATES PATENT OFFICE 2,412,218

CONTROL DEVICE

Milton Hilmer, Center Valley, and George J. Signarovitz, Allentown, Pa., and Thomas Napier Adlam, West Orange, N. J., assignors to Sarco Company, Inc., New York, N. Y., a corporation of New York Application August 31, 1944, Serial No. 552,190

8 Claims. (Cl. 236—74)

1

This invention is for a control device for automatically regulating the flow of a fluid to a receiver in accordance with the pressure of the fluid therein and the temperature exteriorly thereof.

The invention primarily comprehends a control device for automatically regulating the flow of a fluid such as a medium for a heating or a cooling system which is admitted into the system through a valve adapted to be regulated by reciprocating means movable between limits to vary the size of the opening of the port thereof and which reciprocating means is moved in response to predetermined pressure requirements of the fluid in the system and the temperature of the atmosphere outside of the enclosure containing the system.

The invention further embodies a control device of the indicated character in which the reciprocating means for regulating the size of the port opening is actuated by motor driven hydraulic pressure creating means, the motor of which is in circuit with an electric switch for rendering the same active and inactive and wherein the switch is actuated by a lever movable in response to predetermined pressure requirements in the system and the atmospheric temperature outside of the enclosure containing the system.

More particularly, the invention contemplates a control device for regulating the flow of a medium to a system in which said medium may be under positive or negative pressure and the positive pressure in the system may be the actual pressure or the pressure due to the velocity head of the medium therein.

With the foregoing and other objects in view, reference is now made to the following specification and the accompanying drawings in which there is disclosed the preferred embodiments of the invention.

In the drawings:

Fig. 1 is a side view of a control device constructed in accordance with the invention, with parts broken away and shown in section to disclose the underlying structure.

Fig. 2 is a sectional view taken approximately on the line 2—2 of Figure 1.

Fig. 3 is an enlarged fragmentary sectional view taken approximately on the line 3—3 of Figure 2.

Fig. 4 is a fragmentary diagrammatic view illustrating the leverage action for effecting actuation of the electric switch.

Fig. 5 is a fragmentary side view with parts shown in section of the pressure control and connection with the system when the control is

2 by the pressure of the velocity head of the medium in the system.

Fig. 6 is a similar view of the pressure control when the system is under negative pressure.

Fig. 7 is a diagrammatic view illustrating the control device installed in a system.

Referring to the drawings by characters of reference, the control device includes a control valve A for automatically admitting therethrough fluid mediums to heating or cooling systems, one such system being indicated generally by the reference character B. The control valve A is actuated by an hydraulic piston 10 under pressure delivered by a motor driven pump C which is placed in or out of operation in accordance with predetermined pressure requirements in the system and the atmospheric temperature outside of the enclosure containing the system which functions through a lever system D to actuate an electric switch E in circuit with the motor 11 of the motor driven pump C.

The rotor of the pump C is coupled to the rotating shaft of the electric motor 11 and the pump and motor are supported by an angle bracket 12 secured to and depending from the underside of the lower head 13 of a cylinder 14 in which the piston 10 is mounted. The pump and motor together with the cylinder 14 are contained within a casing 15 which also forms an oil reservoir in which the pump and motor are immersed and from which the oil is taken in and forced by the pump through the discharge conduit 16 into the cylinder 14 to create the hydraulic pressure therein below the piston 10. The casing 15 is provided with a cover 17 secured in sealing relation thereon by bolts 18 and which cover is formed with a depending annular flange 19 snugly fitted within the upper end of the cylinder 14 to which the cylinder is secured by bolts 20.

A discharge pipe 21 leads from the cylinder 14 to a solenoid valve 22 located in the casing 15 and through which valve the oil in the cylinder is returned to the casing to thereby relieve the hydraulic pressure below the piston 10. The casing 15 is provided with an oil admission opening in the cover 17 and a drain opening in the bottom wall thereof which are respectively closed by screw plugs 23 and 24.

The piston 10 is affixed to the lower end of a piston rod 25 which extends upwardly through a guide opening 26 in the upper end wall of an inverted cup-shaped member 27 mounted upon the cover 17 and threadedly secured in the central opening 28 thereof. A coiled expansion spring 29 surrounds the piston rod 25 and is interposed between the piston 10 and the end wall of the inverted cup-shaped member 27 so as to tension the piston against the hydraulic pressure produced in the cylinder 14. The piston rod 25 also protrudes through an opening 30 in the upper end wall of an inverted cup-shaped member 31 which is secured to the piston rod by a set screw 32 so as to move with said rod and to mount the same for telescopic sliding engagement with the cup-shaped member 27.

The control valve A is of any desired type and as illustrated the same is provided with inlet and outlet openings 33 and 34 and with aligned ports 35 through which the flow of the medium is controlled by valve disks 36 carried by a valve stem 37. The valve is of the normally closed type having a coiled expansion spring 38 engaging the upper end of the valve stem 37 so as to normally maintain the disks 36 in contact with the valve seats 35. The valve is secured in an opening in the upper end of a yoke 39 mounted upon a housing 40 which is cast integrally with the cover 17 to dispose the housing in upstanding relation thereon and by which arrangement the valve stem is positioned in axial alignment with and is adapted to be engaged by the piston rod 25 for movement therewith to open the valve ports 35 by the hydraulic pressure established under the piston 10.

The electrical switch E consists of an insulated housing having therein fixed contact elements 42 and 43 and a pivoted contact element 44 fulcrumed as at 45 for movement into engagement with the fixed contact elements 42 and 43 respectively and normally urged by a spring 46 into contact with the fixed contact element 42. The switch E is arranged in a circuit which includes a source of current supply 47 having a conductor 48 leading from one pole thereof and connected with one side of the motor 11 and having interposed therein a starting switch 49. A conductor 50 leads from the other pole thereof and is connected with the movable contact element 44 of the switch E, while a conductor 51 leads from the fixed contact element 42 thereof to the other side of the motor, thus completing one of the circuits with the switch. The switch is also in circuit with the winding of the solenoid valve 22 by a conductor 52 which leads from one side of said winding to the fixed contact element 43 of the switch and a conductor 53 which leads from the other side of said winding and is connected to the conductor 48 leading to the current supply 47, thus completing the circuit through the movable contact element 44.

The switch E is provided with an actuator pin 54 which engages with the pivotal contact element 44 and is adapted upon inward movement thereof to separate said pivotal contact element from the fixed contact element 42 to thus break the circuit with the motor 11 and upon further movement of said pin to force said pivotal contact element into contact with the fixed contact element 43 to thereby close the circuit with the winding of the solenoid valve to thereby open the valve. The switch E is rigidly attached to and supported by a pair of arms 55 and 56 which are pivoted by a fulcrum pintle 57 to a bracket 58 carried by the housing 40. A rock lever 59 is also pivotally carried by the fulcrum pintle 57 for swinging movement with the switch and relative thereto for shifting the actuator pin 54 inwardly as described.

Disposed above the switch E is a yoke 60 pivotally attached by a fulcrum pintle 61 to a bracket 62 carried by the housing 40. The yoke is provided with spaced parallel legs 63 and 64 having aligned apertures 65 and 66 through which a thrust rod 67 is freely slidable. The thrust rod is threaded as at 68 and threadedly engages through a nut 69 between which and the leg 64 a coiled expansion spring 70 is interposed in surrounding relation to the thrust rod for normally urging the nut 69 into engagement with the leg 63 of the yoke. The opposite end of the thrust rod is formed with a kerfed head 71 by means of which the thrust rod is rotated to adjust the same axially. The thrust rod adjacent the kerfed head has secured thereto a disk 72 having a knurled periphery with which a detent spring 73 engages to retain the thrust rod in axially adjusted position.

The leg 63 of the yoke 60 is also provided with a stud 74 which is disposed below and in parallel spaced relation to the thrust rod 67 and said stud adjacent its free terminal is provided with a laterally projecting pin 75 to which is attached a coiled contractile spring 76, the opposite end of which is anchored as at 77 to the housing 40 in an elevated position so that the spring 76 normally exerts a tension to swing the yoke upwardly while tensioning the same against downward movement. A depending abutment finger 78 having its free lower end in engagement with the rock lever 59 is mounted for sliding movement on the stud 74 and is adapted to be retained in adjusted position thereon by a set screw 79.

The lever system D is interposed between the thrust rod 67 of the yoke 60 and a pair of plungers 80 and 81 respectively responsive to the predetermined pressure requirements in the system B and the atmospheric temperature outside the enclosure containing the system. The plunger 80 protrudes through the apertured head of a casing 83 with the protruding end thereof pivotally connected to the upper end of a lever 84 of the lever system D and with the outer end of the plunger affixed to the head 85 of an expansible and contractible sealing tube 86 located in the casing 83 in spaced relation to the end and peripheral wall thereof. The sealing tube 86 has its inner end secured to the apertured head of the casing 83 to thereby seal off the plunger 80 from the casing 83. The casing 83 is in communication with the system B by means of the piping 87 through which the pressure of the medium in the system is transmitted to the head 85 to move the plunger 80 and the upper end of the lever 84 against the tension of a coiled expansion spring 88 disposed in surrounding relation to the plunger 80 between the enlarged head thereof and the apertured head of the casing 83.

The lever system D is located in an auxiliary housing 89 to which the casing 83 is secured by bolts 90 with the plunger 80 projecting into the housing through an opening 91 in the side wall 92 thereof and with the inner end of the plunger pivotally engaging the upper end of the lever 84 as described. The auxiliary housing 89 is secured by bolts 93 to a side wall of the housing 40 and which housings have registering openings 94 and 95 disposed in alignment with the axis of the thrust rod 67.

The plunger 81 also projects into the auxiliary housing 89 through an opening 96 in the side wall 92 thereof so as to dispose the plunger 81 parallel to and in the same vertical plane with the plunger 80. The plunger 81 has its inner end swingably connected by a pin and slot connection 97 to the offset lower end of the lever 84, the outer end of the plunger being affixed to the head 98 of an expansible and contractible sealing tube 99 located in a casing 100 in spaced relation to the end and peripheral wall thereof. The sealing tube 99 and the casing 100 are secured at their inner ends to the side wall 92 of the auxiliary housing 89 to seal the tube 99 within the casing 100 and to seal off the plunger 81 from the casing. The said casing is in communication with a bulb 101 by means of flexible tubing 102 which bulb and tubing and the space within the casing surrounding the sealing tube 99 contain a thermal liquid which acts upon the head of the sealing tube to move the plunger 81 and the lower end of the lever 84 in accordance with the pressure set up in the thermal liquid by the expansion thereof due to any increase in temperature of the atmosphere at the location of the bulb. The pressure upon the head of the sealing tube 99 is normally opposed by the tension of a coiled expansion spring 103 surrounding the plunger 81 between the enlarged head thereof and the side wall 92 of the auxiliary housing 89. The spring 103 thus functions to move the plunger 81 and the lower end of the lever outwardly upon any contraction of the thermal liquid due to a decrease in temperature of the atmosphere at the location of the bulb.

The lever system D also includes a lever 104 which is swingably mounted on pivot pins 105 engaging through bearing openings in the bifurcated lower end 106 thereof and through a bracket 107 secured to the inner face of the auxiliary housing 89 for movement of said lever in a plane extending longitudinally through the lever 84. A thrust arm 108 is pivoted to the upper end of the lever 104 and is slidably guided adjacent its inner end in the aligned openings 94 and 95 of the housing 40 and auxiliary housing 89 to thereby dispose the same in axial alignment with the thrust rod 67 and with the free end of said thrust arm 108 normally arranged in abutting engagement with the free end of the thrust rod 67.

The lever 104 is of tubular construction and the same is provided with an abutment element 109 disposed in engagement with the lever 84 on which it rocks as a fulcrum when the opposite ends of lever 84 have relative movement due to unequal movement of the plungers 80 and 81 or when the plungers move in opposite directions. In addition to said rocking movement, the lever 84 moves inwardly and outwardly a distance equal to the sum total of the movements of the plungers 80 and 81 to thereby swing the lever 104 inwardly when the sum total of the movements of the plungers effects inward movement of the lever 84, the spring 76 of the yoke 60 functioning to swing the lever 104 outwardly when the sum total of the movements of the plungers effects outward movement of the lever 84. The aforesaid movement of the lever 104 effects rocking movement of the yoke 60 through the thrust rod 67 and thrust arm 108 to thereby actuate the electric switch E.

The abutment element 109 is adjustable longitudinally of the lever 104 for varying the fulcrum point with the lever 84 to thereby vary the extent of movement of the thrust arm 108 with reference to the movement of the lever 84. For this purpose a manipulating screw 110 is provided which is swively mounted to the lower end of the lever 104 with the threaded end thereof engaging an annulus 111 within the lever 104 for movement of the annulus longitudinally of the lever by turning of the screw 110. The abutment element 109 is affixed to said annulus for movement therewith by studs 112 which are slidable in oppositely disposed longitudinally extending guide slots 113 in the lever 104 and have their outer ends extending through openings in opposite side portions of the abutment element with their inner ends anchored in threaded openings in said annulus. The manipulating screw 110 projects through a slot 114 in the auxiliary housing 89 and is provided with a head 115 for manually turning the same.

A switch actuating leg 116 is affixed to the inverted cup-shaped member 31 which is carried by the piston rod 25 and the electric switch E is provided with a projection 117 which is disposed above the free end of the leg 116 so that when the piston rod is moved upwardly by the hydraulic pressure created by the pump C the leg 116 engages the projection 117 and swings the switch E and the rock lever 59 upwardly which lever upon impingement against a stop finger 118 depresses the actuator pin 54 to break the circuit with the motor 11 and thereby discontinue the operation of the pump C. When the operation of the motor and pump is thus discontinued, the upward opening movement of the valve stem 37 ceases and the valve disks 36 are maintained in open relation which is the maximum opened position of the said disks. If, however, a sufficient quantity of the medium has passed through the valve to maintain the predetermined pressure in the system B before the valve disks 36 have been moved to their maximum opened position, the pressure in the system B will be exerted against the head 85 to force the same together with the plunger 80 inwardly. The inward movement of the plunger 80 functions to rock the levers 84 and 104 to thereby move the lever arm 108 inwardly against the thrust rod 67 of the yoke 60 which swings downwardly and rocks the rock lever 59 so as to depress the actuator pin 54 and thereby move the movable contact element 44 to break the circuit with the motor 11. This discontinues the operation of the pump and the upward movement of the valve stem 37 so that the valve disks 36 are maintained in open suspended relation which permits the flow of the medium into the system B.

In the event that the pressure in the system B continues to rise, the plunger 80 will be moved farther inwardly which will effect a farther inward movement of the lever arm 108 so as to swing the yoke 60 and the rock lever 59 downwardly to depress the actuator pin 54 farther to thereby move the movable contact element 44 into engagement with the fixed contact element 43 and close the circuit with the solenoid valve which is then opened to permit of the discharge of the oil in the cylinder 14 therefrom to the reservoir. When sufficient oil has escaped to permit the piston 10 to fall a distance so that the movable contact element 44 swings away from the fixed contact element 43 the circuit with the solenoid valve is broken which deenergizes the same to thereby close the valve and discontinue the escape of the oil from the cylinder 14. This discontinues the downward or closing movement of the valve disks which are again maintained in open suspended relation.

The aforesaid operations will be automatically repeated until the valve disks are in a position where the required quantity of medium will pass through the valve into the system B to maintain the predetermined pressure therein, whereupon the apparatus will be in equilibrium and will remain in equilibrium so long as the temperature on the outside of the enclosure containing the system B remains constant.

If the temperature at the location of the bulb 101 or outside of the enclosure containing the system B increases, the thermal fluid within the bulb will expand and exert pressure on the head 98 to force the same together with the plunger 81 inwardly which will rock the levers 84 and 104 to thereby move the lever arm 108 inwardly and rock the yoke 60 and rock lever 59 to depress the actuator pin 54 and break the circuit with the motor. This discontinues the operation of the pump and the upward movement of the valve stem whereby the opening movement of the valve disks ceases and the same are maintained in open suspended relation. If the temperature at the location of the bulb continues to increase the pressure on the head 98 will increase with a consequent further inward movement of the plunger 81 which through the yoke 60 and rock lever 59 effects a farther downward movement of the actuator pin 54 to thereby close the circuit with the solenoid valve 22 which opens to permit of the discharge of the oil from the cylinder 14. This permits of the descent of the piston 10 until the circuit with the solenoid valve is broken whereupon the valve closes and discontinues the discharge of the oil from the cylinder 14 so that the downward movement of the valve disks will cease and the same will again be maintained in open suspended relation to permit of the passage of the medium therethrough in accordance with the requirement of the temperature condition at the location of the bulb.

In the event that a decrease in pressure occurs in the system B or a decrease in temperature occurs at the location of the bulb 101, the pressure on the heads 85 and 98 will be diminished thus permitting the springs 88 and 103 to move the plungers 80 and 81 outwardly respectively to thereby relieve the pressure on the yoke 60 so that the spring 76 rocks the same upwardly. This relieves the pressure on the rock lever 59 so that the movable contact element 44 engages the fixed contact element 42 to close the circuit with the motor whereby the pump C is started and the piston 10 forced upwardly to effect a wider opening of the valve ports. Should such changes in pressure and temperature occur simultaneously the lever 84 will be rocked in accordance with the sum total of the movements of the plungers 80 and 81 with a consequent operation of the switch E and a resultant movement of the valve stem 37 to enlarge or decrease the valve port opening.

The pressure acting upon the piston head 85 to move the plunger 80 may be the pressure of the medium in the system B as hereinbefore described or the same may be the pressure set up by the velocity of the medium passing through a restricted orifice in the system B. In Figure 5 of the drawings the casing 83 is connected with the system B by piping 119 having an open end 120 located at the center of a restricted orifice 121 in the system B with the said open end 120 disposed in confronting relation to the direction of flow of the medium therein.

The dynamic pressure of the medium induced by the velocity of the flow thereof at the orifice 121 will be transmitted to the head 85 of the expansible and contractible tube 86 for moving the plunger 80 in accordance therewith.

The system B may also be under negative pressure or below atmospheric pressure in which event the casing 123 connected with the system B by piping 124 as illustrated in Figure 6 of the drawings will be under negative pressure internally and the spring 88 functioning to normally move the head 85 and the piston 80 outwardly is opposed by a coiled expansion spring 125 which is interposed between the head 85 and the casing 123 whereby the springs 88 and 125 will move the piston 80 in accordance with variations in the negative pressure in the casing 123.

As hereinbefore described the abutment element 109 is movable longitudinally of the lever 104 so as to adjust the relative effects of the movement of the plungers 80 and 81 and consequently the relative effect of the outside temperature of the bulb 101 and the steam pressure acting on the plunger head 85. As the abutment element 109 is moved inwardly toward the thrust arm 108 by adjusting the knob 115, the effect of the steam pressure on the plunger head 85 is increased, that is, a relatively large temperature change surrounding the bulb 101 is required to cause an increment change in the steam pressure. Conversely as the abutment element 109 is moved outwardly or away from the thrust arm 108, the effect of the steam pressure is decreased and that of the bulb increased, so that in this latter position a relatively small change of temperature at the bulb 101 effects the same increment of pressure change on the plunger head 85. Therefore, by manipulating the knob 115, it is possible to locate the abutment element 109 so as to supply the correct amount of steam pressure when the temperature at the bulb 101 varies from 70 degrees F., down to the predetermined low temperature of 0 degree F., by way of illustration. If it is found on certain installations that the steam pressure is too high at 0 degree F., by adjusting the knob 115 it is possible to reduce the pressure or conversely if it is too low, it is possible to increase the same. This renders it possible to adjust the device so that the same is adaptable to varying pressure and temperature ranges.

An outwardly opening relief check valve 127 is threadedly secured in the casing 83 in the two forms of the invention shown in Figures 1 to 5 inclusive of the drawings and in the casing 123 in the form of the invention shown in Figure 6 thereof, for relieving and exhausting to the atmosphere the steam pressure therein when the same becomes excessive or exceeds the pressure set on the check valve.

The valve A has its inlet end 33 connected with a supply steam line 128 and its outlet end 34 connected with a pipe line 129 leading to the system B. A by-pass line 130 having a shut off valve 131 therein is provided which connects the supply steam line 128 with the pipe line 129 on opposite sides of the steam valve A. Within the loop formed by the by-pass line 130, there is interposed a strainer 132 adjacent the valve A and on opposite sides of the valve A are shut off valves 133 and 134 adapted to be closed for directing the steam through the by-pass line and around the valve A when the automatic control is not required in which event the valve 131 is opened.

A room thermostat 135 may be located in any desired part of the enclosure or building heated by the system B which thermostat as illustrated in Figure 7 of the drawings may be inserted in the conductor line 48 so that the same functions to disconnect the circuit with the switch E when the enclosure or building reaches a predetermined temperature set on the thermostat to thereby permit the valve A to close and discontinue the flow of steam to the system B.

What is claimed is:

1. In a control device, a valve for permitting the passage of a medium therethrough to a receiver, a pressure creating means for actuating said valve, electrical means for driving said pressure creating means, an electrical switch in circuit with said electrical means, a pair of spaced plungers, means interposed between said receiver and one of said plungers and acted upon by and responsive to the pressure of the medium in the receiver for moving said plunger in response to pressure changes of the medium, thermo-sensitive means located exteriorly of said receiver, means interposed between the other plunger and said thermo-sensitive means and responsive thereto for moving the same in response to temperature changes exteriorly of said receiver, a lever connected at its opposite ends to said plungers respectively for movement therewith, a second lever pivoted at one end and having an abutment defining a fulcrum against which the first named lever engages and means operatively engaging said second named lever and said switch for actuating said switch by the sum total of the movements of said plungers effecting translatory movement of said first named lever and swinging movement of said second named lever to thereby control the operation of said electrical means and the pressure creating means so as to maintain a flow of said medium in accordance with pressure requirements thereof and the temperature exteriorly of the receiver.

2. In a control device, a valve for permitting the passage of a medium therethrough to a receiver, a pressure creating means for actuating said valve, electrical means for driving said pressure creating means, an electrical switch in circuit with said electrical means, a pair of spaced plungers, means interposed between said receiver and one of said plungers and acted upon by and responsive to the pressure of the medium in the receiver for moving said plunger in response to pressure changes of the medium, thermo-sensitive means located exteriorly of said receiver, means interposed between the other plunger and said thermo-sensitive means and responsive thereto for moving the same in response to temperature changes exteriorly of said receiver, a lever connected at its opposite ends to said plungers respectively for movement therewith, a second lever pivoted at one end and having an abutment defining a fulcrum against which the first named lever engages and rocks on relative movement of said plungers, means operatively engaging said second named lever and said switch for actuating said switch by the sum total of the movements of the said plungers effecting translatory movement of said first named lever and swinging movement of said second named lever to thereby control the operation of said electrical means and the pressure creating means so as to maintain a flow of said medium in accordance with pressure requirements thereof and the temperature exteriorly of the receiver and said abutment being adjustable longitudinally of said second named lever for varying the fulcrum point with the first named lever to thereby vary the pressure of the medium in the receiver.

3. In a control device, a valve for permitting the passage of a medium therethrough to a receiver, a pressure creating means for actuating the valve by the pressure created thereby, electrical means for driving said pressure creating means, a solenoid valve for relieving the pressure created by said pressure creating means, an electrical switch in circuit with said electrical means and said solenoid valve, a pair of spaced plungers, means interposed between said receiver and one of said plungers and acted upon by and responsive to the pressure of the medium in the receiver for moving said plunger in response to pressure changes of the medium, thermo-sensitive means located exteriorly of said receiver, means interposed between the other plunger and said thermo-sensitive means and responsive thereto for moving the same in response to temperature changes exteriorly of said receiver, a lever connected at its opposite ends to said plungers respectively for pivotal movement with each of said plungers and translatory movement therewith, a second lever pivoted at one end for movement in a plane extending longitudinally through said first named lever and having an abutment defining a fulcrum on which said first named lever rocks on relative movement of said plungers, said second named lever swinging on its pivotal connection when the sum total of the movement of the plungers effect translatory movement of the first named lever, means operatively engaging said second named lever and said switch for effecting actuation of said switch upon swinging movement of said second named lever to thereby discontinue operation of said electrical means and the pressure creating means whereby the valve is maintained in suspended open relation permitting the passage of the medium therethrough to the receiver, said switch actuating means functioning on further swinging movement of said second named lever to actuate the switch to close the circuit with said solenoid valve to thereby effect a reduction of the pressure created by said pressure creating means so as to limit the passage of the medium through said valve to the receiver for automatically maintaining a flow of said medium in accordance with pressure requirements thereof in the receiver and the temperature exteriorly of the receiver.

4. In a control device, a valve for permitting the passage of a medium to a receiver, a pressure creating means for actuating the valve, electrical means for driving said pressure creating means, an electrical switch in circuit with said electrical means, a pair of spaced plungers, means interposed between said receiver and one of said plungers and acted upon by and responsive to the pressure of the medium in the receiver for moving said plunger in response to pressure changes of the medium, thermo-sensitive means located exteriorly of said receiver, means interposed between the other plunger and said thermo-sensitive means and responsive thereto for moving the same in response to temperature changes exteriorly of said receiver, a lever connected at its opposite ends to said plungers respectively for pivotal movement with reference to each of said plungers and for translatory movement therewith, a second lever pivoted at one end for movement in a plane extending longitudinally through said first named lever and having an abutment defining a fulcrum on which said first named lever rocks on relative movement of said plungers, said second named lever swinging on its pivotal connection upon translatory movement of said first named lever, means operatively engaging said second named lever and said switch for effecting actuation of said switch upon swinging movement of said second named lever to thereby discontinue operation of said electrical means and said pressure creating means whereby the valve is maintained in open relation permitting the passage of the medium therethrough to the receiver so as to maintain a flow of the medium in accordance with the pressure requirements thereof in the receiver and the temperature exteriorly of the receiver.

5. In a control device, a valve for permitting the passage of a medium therethrough to a receiver, a pressure creating means for actuating said valve, electrical means for driving said pressure creating means, an electrical switch in circuit with said electrical means, a pair of spaced elements, means interposed between said receiver and one of said elements and acted upon by and responsive to the pressure of the medium in the receiver for moving said element in response to pressure changes of the medium, thermo-sensitive means located exteriorly of said receiver, means interposed between the other element and said thermo-sensitive means and responsive thereto for moving the same in response to temperature changes of said receiver, a lever connected at its opposite ends to said elements respectively for movement therewith, a second lever pivoted for swinging movement and having an abutment defining a fulcrum against which the first named lever engages and means operatively engaging said second named lever and said switch for actuating said switch by the movements of said elements effecting movement of said levers to thereby control the operation of said electrical means and the pressure creating means so as to maintain a flow of said medium through said valve in accordance with pressure requirements thereof in the receiver and the temperature exteriorly of the receiver.

6. In a control device, a valve for permitting the passage of a medium therethrough to a receiver, means for actuating said valve, electrical means for operating said valve actuating means, an electrical switch in circuit with said electrical means, a pair of spaced plungers, means interposed between said receiver and one of said plungers and acted upon by and responsive to the pressure of the medium in the receiver for moving said plunger in response to pressure changes of the medium, thermo-sensitive means located exteriorly of said receiver, means interposed between the other plunger and said thermo-sensitive means and responsive thereto for moving the same in response to temperature changes exteriorly of said receiver, a lever connected at its opposite ends to said plungers respectively for movement therewith, a second lever having an abutment defining a fulcrum against which the first lever engages, means operatively engaging said second named lever and said switch for actuating said switch by the movements of said plungers effecting movement of said levers to thereby control the operation of said electrical means and valve actuating means so as to regulate the flow of the medium through the valve in accordance with pressure changes of the medium in the receiver and temperature changes exteriorly thereof, and said abutment being adjustable longitudinally of said second named lever for regulating the device to render the same adaptable for varying pressure and temperature ranges.

7. In a control device, a valve for permitting the passage of a medium therethrough to a receiver, means for actuating said valve, electrical means for operating said valve actuating means, an electrical switch in circuit with said electrical means, a pair of spaced plungers, means interposed between said receiver and one of said plungers and acted upon by and responsive to the pressure of the medium in the receiver for moving said plunger in response to pressure changes of the medium, thermo-sensitive means located exteriorly of said receiver, means interposed between the other plunger and said thermo-sensitive means and responsive thereto for moving the same in response to temperature changes exteriorly of said receiver, a lever connected to said plungers at spaced longitudinal points thereon, a second lever mounted for swinging movement, an abutment arranged between said levers and defining a fulcrum therebetween on which said first named lever rocks, means operatively engaging said second named lever and said switch for actuating said switch by the movements of said plungers effecting movement of said levers to thereby control the operation of said electrical means and the valve actuating means so as to regulate the flow of the medium through the valve in accordance with pressure changes of the medium in the receiver and temperature changes exteriorly thereof, and said abutment being adjustable longitudinally of said levers for regulating the device to render the same adaptable for varying pressure and temperature ranges.

8. In a control device, a valve for permitting the passage of a medium therethrough to a receiver, pressure creating means for actuating said valve, means for driving said pressure creating means and means controlling said driving means, said last named means including a pair of spaced elements, means interposed between said receiver and one of said elements and acted upon by and movable in response to the pressure of the medium in the receiver for moving said element in response to pressure changes of the medium, thermo-sensitive means located exteriorly of said receiver, means interposed between the other element and said thermo-sensitive means and responsive thereto for moving the same in response to temperature changes exteriorly of said receiver, a lever connected at its opposite ends to said elements respectively for movement therewith, a second lever pivoted for swinging movement and providing a fulcrum against which the first named lever engages, and interengageable means between said second named lever and said driving means for controlling the driving means so as to maintain a flow of said medium through said valve in accordance with pressure requirements in the receiver and the temperature exteriorly of the receiver.

MILTON HILMER.
GEORGE J. SIGNAROVITZ.
T. NAPIER ADLAM.